Figure 1:
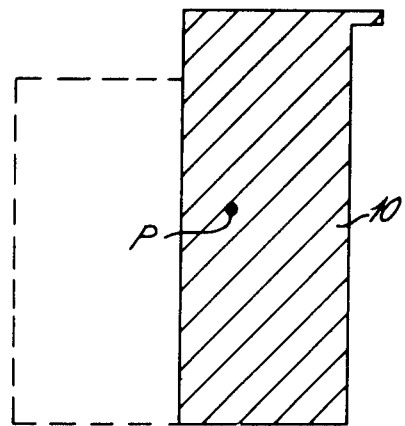
Figure 1:
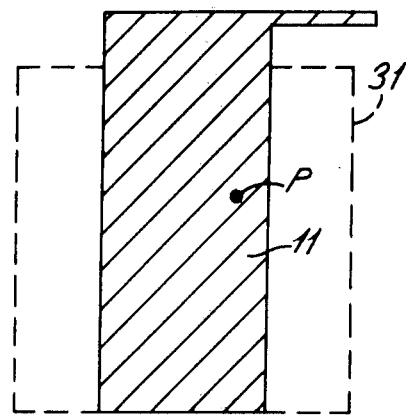
Figure 1:
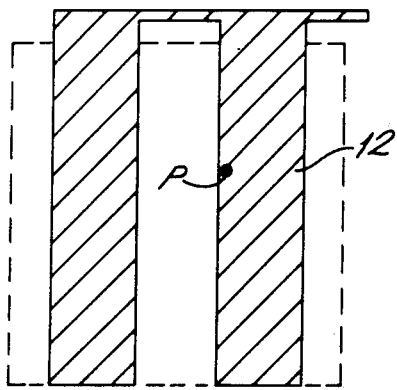
Figure 1:
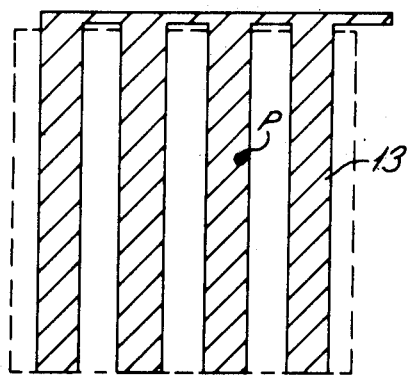
Figure 1:
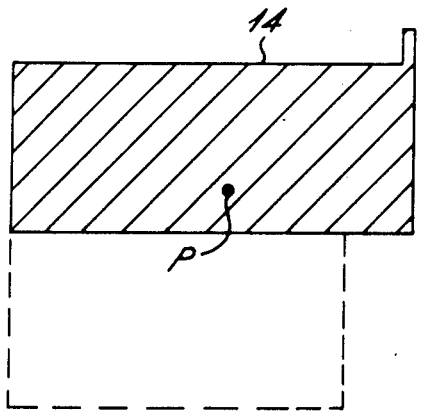
Figure 1:
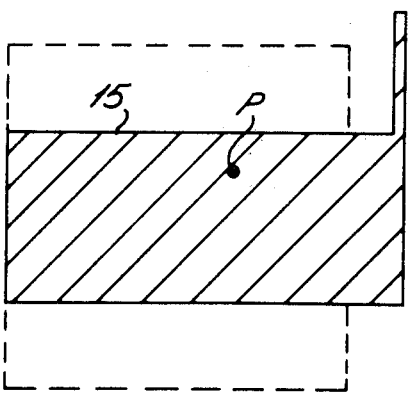

United States Patent [19]

Gordon

[11] 4,126,760
[45] Nov. 21, 1978

[54] POSITION INDICATORS

[75] Inventor: John A. Gordon, Hatfield, England

[73] Assignee: National Research Development Corporation, London, England

[21] Appl. No.: 823,167

[22] Filed: Aug. 9, 1977

[30] Foreign Application Priority Data

Aug. 16, 1976 [GB] United Kingdom ............... 33972/76

[51] Int. Cl.² .............................................. G08C 21/00
[52] U.S. Cl. ........................................ 178/18; 178/19; 340/347 AD
[58] Field of Search ............... 178/18, 19; 340/365 R, 340/365 A, 347 AD; 200/46; 33/1 M

[56] References Cited

U.S. PATENT DOCUMENTS

| 3,466,646 | 9/1969 | Lewin ................................... 178/19 |
| 3,696,411 | 10/1972 | Kilby et al. ....................... 340/365 A |
| 3,914,548 | 10/1975 | Barish ................................... 178/18 |
| 3,921,165 | 11/1975 | Dym ..................................... 178/18 |

*Primary Examiner*—Thomas A. Robinson
*Attorney, Agent, or Firm*—Cushman, Darby & Cushman

[57] ABSTRACT

A graphical input tablet is described which is made up of layers of flexible material. The edges of planar conductors on the surfaces of the layers divide the layers into zones, with each layer having a unique combination of zones. When a point is indicated on the writing area of the tablet by applying pressure thereto, conductors on facing surfaces of the adjacent layers make contact and the contacts made are indicative of the position of the point.

13 Claims, 5 Drawing Figures

POSITION INDICATORS

The present invention relates to apparatus for providing a signal representative of a coordinate of a point whose position is indicated by the application of pressure on a surface at that point. Such apparatus is particularly, but not exclusively, useful in graphical input tablets for computers.

A large number of graphical input tablets have been devised and one class of such devices suffers from the disadvantage that a special stylus, or light pen, is required which has an external and, to some extent, constraining connection to the remainder of the apparatus. Thus an ordinary pen or pencil cannot be used.

Other graphical input tablets use spaced-apart facing resistive surfaces one of which is mounted on a flexible substrate. To indicate the position of a point a stylus which can be an ordinary pen is used to press the flexible substrate so the resistive surfaces contact one another. While such arrangements can be made to work well, additional circuits are required to condition the output signals from the tablets and produce a coded digital signal representative of position. This is also true of tablets which are constructed from crossed arrays of conductors which are again pressed into contact at the point of interest. Usually an overlay covers the crossed array and the stylus is pressed on the flexible overlay.

According to the present invention there is provided apparatus for indicating a coordinate of a point in an area of interest, or working area comprising a plurality of spaced apart layers in a stack, each layer containing at least one conductor having at least one substantially planar rectangular surface area, each layer being divided into a number of rectangular zones by conductor surface area boundaries with two opposite boundaries of each zone substantially at right angles to the direction in which a coordinate is to be measured, each zone being constituted either by at least part of a conductor or by absence of a conductor, and the division into zones being different for each layer, the stack including a plurality of contact means, at least one associated with each conductor and spaced therefrom, and the layers of the stack, and the contact means, being so constructed that when a point on one face of the stack is indicated by pressure at that point, each conductor which extends to the position corresponding to the point in the layer containing that conductor, is pressed into contact with its associated contact means or one of its associated contact means.

The division of the layers preferably follows a regular scheme corresponding to a position code. The number of divisions may increase regularly with progression through the stack. Each contact means may be one of the said conductors, each conductor serving as the or one of the contact means associated with another conductor; or each contact means may be a separate conductor adjacent to, but spaced from, the conductor with which it is associated.

One of the main advantages of apparatus according to the invention is that circuits for providing a coded digital output indicative of a coordinate can be eliminated or simplified. Further the absolute digital position of the indicated point is obtained, not simply a voltage proportional to position.

Each layer, except the extreme layers, may comprise a flexible insulating sheet with a conductor or conductors on each side and the two extreme layers may then comprise insulators, at least one of which is a flexible sheet, with a conductor or conductors on that side which is adjacent to the remainder of the stack. An additional advantage is that the conductors need not be uniform, so if deposited, the problems of conductor deposition are eased particularly. This compares favourably with many other graphical input devices where uniform resistance or conductors are required.

If the conductors are arranged in the way mentioned in the preceding paragraph conductors on opposite surfaces of adjacent layers will make contact when pressure is applied to the face of the stack to indicate a point but only at points under the indicated point.

In one aspect of the invention, in each pair of opposite surfaces, a single conductor may be mounted or deposited on, or fixed to, one of the said opposite surfaces and may be shaped to divide the surface into a plurality of areas corresponding to one symbol in a position indicating code while the conductor on the other of the opposite surfaces forming the associated contact means then extends to at least cover a corresponding area to that of the shaped conductor. One conductor in each further pair of opposite surfaces provides a further symbol in the code, and thus for a four digit code, four pairs of oppositely adjacent conductors and their insulating supports make up the stack.

Preferably the shaped conductor forms one or more rectangular areas with each area having opposite sides at right angles to the direction in which the coordinate is to be measured, the width of the areas between the opposite sides and the positioning of the areas depending upon the position-indicating code chosen.

In order to provide rectangular coordinates of a point's position two such stacks are used. In one stack the boundaries of the zones are at right angles to a direction in which the 'x' coordinate is measured and in the other stack, which is above or below the first mentioned stack, the zone boundaries are at right angles to the direction of the 'y' coordinate.

The above mentioned two stack arrangement has the advantage that each opposite pair of conductors provides a bit which, with the zone boundaries appropriately positioned, generates an output in a useful code such as the Gray code. On the other hand, however, a large number of layers is required for high resolution in two coordinates.

In another aspect of the invention, facing surfaces of adjacent layers are each substantially covered by a plurality of conductors separated by narrow gaps and the layers are divided by the gaps into rectangular zones each of which extends from one edge of the area of interest to the opposite edge, and each zone has opposite sides traversing the said area at right angles to the direction in which the coordinate is to be measured.

In one scheme, if the required resolution is $n$ which has factors $p$ and $q$ then two layers are provided and there are $n$ equal-width rectangles in that surface of one layer which faces the other layer and $p$ equal-width rectangles in that surface of the other layer which faces the said one layer. With such an arrangement the $n$ conductors can be regarded as being grouped in $p$ groups each containing $q$ conductors and $q$ connections are provided to connect rectangles which correspond in position in the groups. A separate connection is provided for each of the $p$ rectangles. Hence there are $p + q$ external conductors required for each pair of opposite surfaces. Here the $n$ conductors act as the contact means for the $p$ conductors and vice versa.

The position of a point indicated is detected by determining which two conductors are connected together. In this way a two symbol code is provided, the more significant symbol being that corresponding to the conductor connected to one of the $p$ conductors, and the two symbols corresponding to the position of the point.

An advantage of such an arrangement is that in many cases only two opposite surfaces will be required for each coordinate. At the same time only relatively few external connections are required and the position of the point is obtained as a two digit number already coded. For example if a resolution of 256 is required, $p = q = 16$, and so 32 external conductors are required.

Again where high resolution is required more opposite surfaces carrying conductors can be provided, and of course for $x$ and $y$ coordinates two groups of layers are used in which the zones have boundaries which are at right angles to the $x$ and $y$ directions, respectively.

The conductors of each layer need not be separated by insulating sheets and for example they may be mounted on perforated substrates so that three or more conductors contact one another when the position of a point is indicated. In such an arrangment each layer may be divided into rectangles which traverse the whole area of interest from one opposite edge to another and again have sides at right angles to the direction in which the coordinate is to be measured. In this case, however, if $n = n_1 n_2 n_3 \cdots n_r$ is the resolution required and there are $r$ layers which can be pressed into contact with one another, the layer providing the most significant symbol is divided into $n_1$ rectangles, the layer providing the next most significant symbol is divided into $n_1 n_2$ rectangles and so on with the $p^{th}$ layer having $n_1 n_2 n_3 \cdots n_p$ rectangles.

The above outlined arrangements show how numbers of layers, numbers of external conductors and type of code can be chosen to suit different applications.

Hardware decoding to, for example, binary or decimal for either aspect of the invention is, it will be realised, a simple matter but in many applications the apparatus is coupled to a computer and any decoding required is merely a programming matter.

Figure 2:
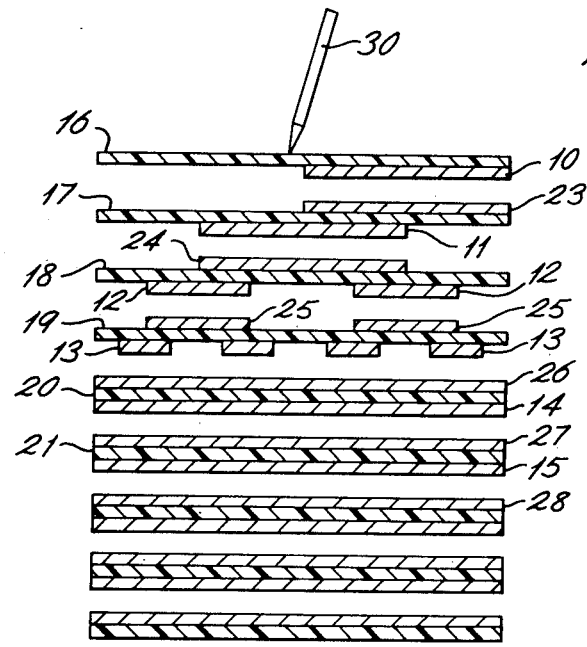
Figure 4:
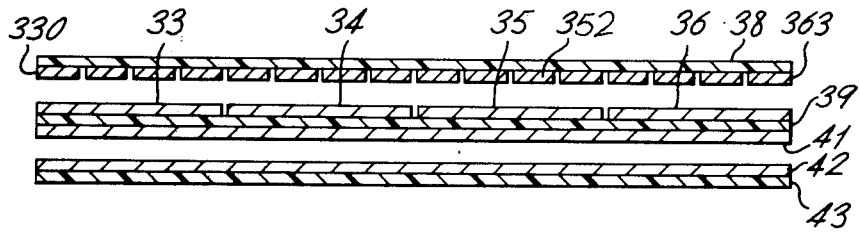
Figure 3:
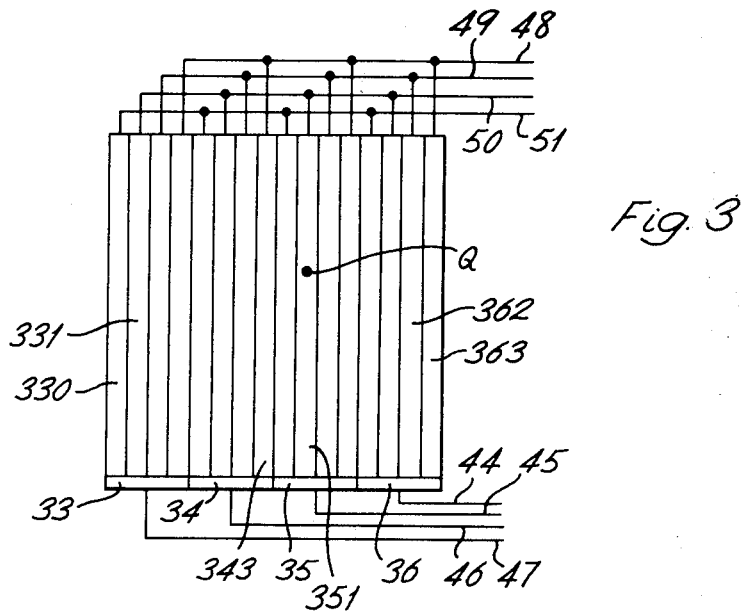
Figure 5:
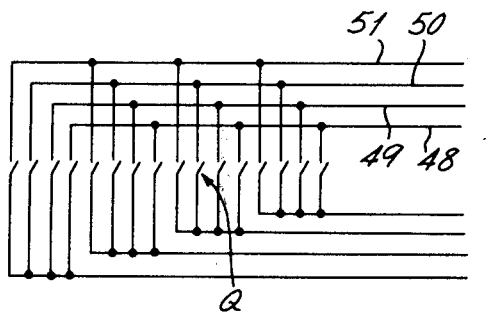

Certain embodiments of the invention will now be described, by way of example, with reference to the accompanying drawings in which:

FIG. 1 shows plan views of various conductors forming components of a graphical input tablet according to the invention, FIG. 2 shows an exploded cross-section of part of a graphical input tablet which uses the conductors of FIG. 1, FIG. 3 shows some of the conductors of a second graphical input tablet according to the invention, FIG. 4 shows an exploded cross-section of a graphical input tablet which uses the conductors of FIG. 3, and FIG. 5 shows an equivalent circuit for the graphical input tablet of FIG. 3.

Referring to FIGS. 1 and 2, six flexible laminar conductors 10 to 15 of different shapes or orientation are mounted or deposited, on flexible insulating sheets 16 to 21, respectively. Opposite the conductors 10 to 15 are other conductors 23 to 28, respectively, mounted on the flexible sheets. Each of the conductors 23 to 28 need only extend across the same area as the conductor it is opposite but where as in the case of the conductor 13 a fairly complicated shape is required, the opposite conductor 26 may cover the whole of the area of interest. The sheets are stretched between spacers (not shown) to separate them and the conductors from each other. The spacing shown in FIG. 2 between the flexible sheets is exaggerated for clarity so that for the sizes of sheet shown the gaps between sheets and conductors are much smaller in a practical arrangement.

The upper surface of the sheet 16 in FIG. 2 is the writing surface where data entries in the form of words or diagrams are made by writing with a stylus such as the stylus 30 shown. When the stylus is pressed to write a word the coordinates of the current point at which pressure is applied are obtained from the various conductors. The sheets and conductors are pressed together at the point and where there are conductors opposite one another a contact is made. If for example in FIG. 2 the lower conductors in each opposite pair are connected to a battery, the upper conductors will receive the battery voltage where contact is made.

For the '$x$' coordinate and a 16 division resolution the conductors 10 to 13 are shaped as shown: the conductor 10 covers the right-hand half of the area of interest indicated by the dashed line 31; the conductor 11 covers the central half of the area of interest; the conductor 12 covers two quarter areas placed symmetrically from the central axis of the area 31 but spaced by two divisions from the edge of the area 31; and the conductor 13 defines four rectangles each having a width of two divisions equally spaced from one another, the extreme rectangles being separated by one division from the edge of the area 31. Hence 16 zones are provided and bounded by the edges of conductors in different layers. The conductors 14 and 15 show the beginning of a series of four conductors for indicating the '$y$' coordinate. The series is the same as the series for the '$x$' coordinate but rotated through 90°.

By way of example suppose pressure is applied to the point P shown in FIG. 1. Since this is within the area of each of the conductors 10, 11, 12 and 13 the '$x$' coordinate of the point P as obtained from the tablet is 1111. It will be recognised that 1111 is the Gray code for the coordinate of this point.

The first two figures of the Gray code for the '$y$' coordinate are obtained from conductors 14 and 15.

As has been mentioned, in order to avoid the use of a large number of layers for any given resolution the area of interest can be divided up into a number of rectangles equal to one of two factors of the resolution. For example in FIG. 3 a resolution of 16 is required and therefore four lower conductors 33 to 36 shown in FIG. 4 and whose edges can be seen in FIG. 3 are mounted on a flexible insulating sheet 39. Opposite the conductors 33 to 36 are four groups of four conductors mounted on another flexible sheet 38. The conductors in each group are designated with a number whose first two significant figures correspond with the conductor the groupe faces but some of these designations only are marked in FIGS. 3 and 4.

To provide the other coordinate, rectangular conductors at right angles to the rectangles of FIG. 3 and in the same pattern are provided. Two of these conductors 41 and 42 are shown in FIG. 4. The conductor 41 is mounted together with four like conductors on the flexible sheet 39 and the conductor 42 with sixteen like conductors is mounted on a rigid sheet 43. These sixteen conductors form zone boundaries. As in FIG. 2 the spacing between the flexible sheets and conductors is exaggerated and the sheets are stretched between spacers (not shown).

As before when a point is to be indicated pressure is applied to the upper flexible sheet 38 and the conductors connected to the various sheets are pressed together.

Separate external conductors 44 to 47 are connected to the conductors 36, 35, 34 and 33, respectively, and corresponding conductors in each of the groups 330 to 333, 340 to 343, 350 to 353 and 360 to 363 are connected together by means of conductors 48 to 51.

The equivalent circuit for the 'x' coordinate conductors of FIG. 3 is shown in FIG. 5 where sixteen switches are shown. Each time a point is indicated one of these switches is closed by conductors being brought together. Another equivalent circuit (not shown) exists for the 'y' coordinate.

The conductors 44 to 47 are, in one example, connected to one terminal of a battery not shown while the conductors 48 to 51 are connected to the other terminal of the battery. Each conductor 44 to 47 and 48 to 51 is provided with an individual current sensor (not shown) such as a resistor and a transistor circuit to sense the voltage across the resistor. The current sensors for the conductors 44 to 47 provide the most significant symbol in the 'x' coordinate indicating signal and the current sensors for the conductors 48 to 51 provide the least significant symbol. For example using the quaternary system (base 4) the conductors 48 to 51 correspond to the least significant digits 0 to 3 respectively, and the conductors 44 to 47 correspond to the more significant digits 0 to 3, respectively. Thus if pressure is applied to the point Q the 'x' coordinate signal 21 is obtained which when decoded to the decimal system corresponds to 9. As can be seen the point Q is in the ninth zone from the left of FIG. 3 if the extreme left-hand zone is numbered 0.

Should it be required to increase the resolution of each coordinate in the arrangement of FIGS. 3 and 4 to 256, the upper and lower opposite surfaces for each coordinate may be divided into 16 and 256 conductors, respectively, or vice versa, although it would be possible instead to add a further two surfaces containing oppositely positioned conductors, one for each coordinate, below those shown in FIG. 4. The conductors of the upper further surface will then each correspond in width to one quarter of the conductor 330 and the conductors of the lower further surface will have a width which is equal to a sixteenth of that of the conductor 330. Four digits will then be obtained for each 'x' and each 'y' coordinate.

If in an input tablet according to the invention, problems occur due to the gaps between conductors, circuits may be provided for detecting when two coplanar adjacent conductors are contacted by an oppositely positioned conductor and logical circuits may be provided for selecting output signals from conductors to round up or round down the coordinate.

While two embodiments have been specifically described it will be realised that the invention can be put into practice in many other ways. For example in the arrangement of FIGS. 1 and 2 or that of FIGS. 3, 4 and 5 the rectangles formed by conductors may be of different widths and may be differently located. Different codes may be used in deciding on zone boundaries and more layers may be used to give greater resolution. The area of interest may be divided into thirds and multiples thereof or other numbers and their multiples. Instead of connections simply being made by conductors facing one another and separated by insulating sheets the insulating sheets may themselves be perforated so that connections can be made between three or more conductors in different planes. Thus it is possible to make arrangements analogous to the two embodiments but employing three or more contactable conductors and it is not necessary in the arrangement of FIGS. 3, 4 and 5 that the conductors representing the more significant bits are square roots of the required resolution.

I claim:

1. Apparatus for indicating a coordinate of a point in a working area, comprising a plurality of generally coextensive, adjacent but spaced apart layers, each layer containing at least one conductor having at least one substantially planar rectangular surface area, each layer extending across the working area and being entirely divided, within the working area, into a number of rectangular zones by conductor surface area boundaries with two opposite boundaries of each zone extending completely across the area of interest substantially at right angles to the direction in which a coordinate is to be measured, each zone being constituted either by at least part of a conductor or by absence of a conductor, and the division into zones being different for each layer, the apparatus including a plurality of contact means, at least one associated with each conductor and spaced therefrom, and the layers and the contact means being so constructed that when a point in the working area is indicated by pressure at that point on an outer layer of the plurality of layers, each conductor which extends to the position corresponding to the point in the layer containing that conductor is pressed into contact with its associated contact means of one or its associated contact means.

2. Apparatus according to claim 1 wherein each contact means comprises one of the said conductors, each of the said conductors serving as the or one of the contact means associated with another of the said conductors.

3. Apparatus according to claim 1 wherein each contact means comprises a separate further conductor adjacent to, but spaced from, that one of the said conductors with which it is associated.

4. Apparatus according to claim 1 wherein each layer, except the extreme layers, comprises a flexible insulating sheet with at least one of the said conductors or at least one of a number of conductors forming the contact means on each side, and the two extreme layers then each comprising an insulator, at least one of which is a flexible sheet, with at least one of the said conductors or at least one of the conductors forming the contact means on that side of each insulator which is adjacent to the remainder of the layers.

5. Apparatus according to claim 3 wherein each layer is divided into rectangular zones forming a plurality of areas which together correspond to one symbol in a position indicating code.

6. Apparatus according to claim 5 wherein each layer comprises a single conductor shaped to divide the layer into rectangular zones.

7. Apparatus according to claim 6 wherein each further conductor extends to cover at least an area corresponding to that one of the shaped conductors with which it is associated.

8. Apparatus according to claim 2 wherein opposite facing surfaces of adjacent layers are each substantially covered by a plurality of conductors separated by narrow gaps and the layers are divided by the gaps into rectangular zones each of which extends from one edge of the working area to the opposite edge, and each zone has opposite sides traversing the said area at right angles to the direction in which the coordinate is to be measured.

9. Apparatus according to claim 8 wherein the resolution of the working area afforded by one pair of facing surfaces of adjacent layers is $n$, where $p$ times $q$ equals $n$, one of the facing surfaces is divided into $n$ equal-width rectangles and the other such surface divided into $p$ equal-width rectangles, the apparatus comprising one connection from each of the $p$ rectangles and $q$ connections from the $n$ rectangles for making external connections to the apparatus, the $n$ rectangles being divided into $p$ groups with $q$ adjacent rectangles in each group, and each rectangle in each group being connected to a different one of the $q$ connections.

10. Apparatus according to claim 2 wherein the conductor or conductors of each intermediate layer are able to contact the conductor or conductors of adjacent layers on both sides and the conductor or conductors of extreme layers are able to contact the conductor or conductors of the adjacent layer.

11. Apparatus according to claim 10 wherein the resolution of the working area afforded by the apparatus is $n$, where $n = n_1 n_2 n_3 \cdots n_p$, and the conductors of each layer are separated by narrow gaps and except for the gaps extend completely across the whole layer, a first layer is divided into $n_1$ rectangles, a second layer is divided into $n_1 n_2$ rectangles and so on with a $p^{th}$ layer divided into $n_1 n_2 n_3 \cdots n_p$ rectangles.

12. A first apparatus according to claim 1 for indicating coordinates in a first direction in combination with a second apparatus according to claim 1 for indicating coordinates in a second direction at right angles to the first direction, the said boundaries of each zone of the layers of the first apparatus being at right angles to the said boundaries of each zone of the layers of the second apparatus.

13. A first apparatus according to claim 8 for indicating coordinates in a first direction in combination with a second apparatus according to claim 8 for indicating coordinates in a second direction at right angles to the first direction, the said boundaries of each zone of the layers of the first apparatus being at right angles to the said boundaries of each zone of the layers of the second apparatus.

* * * * *